US007021639B2

(12) United States Patent
Park

(10) Patent No.: US 7,021,639 B2
(45) Date of Patent: Apr. 4, 2006

(54) BICYCLE OF TYPE DRIVEN BY OPERATION OF HANDLE

(76) Inventor: Hun Geun Park, #208, Roha 2-ri Paltan-myun, Hwasung-gun, Gyeonggi-do, 44-913 (KR)

( * ) Notice: Subject to any disclaimer, the term of this patent is extended or adjusted under 35 U.S.C. 154(b) by 325 days.

(21) Appl. No.: 10/668,928

(22) Filed: Sep. 23, 2003

(65) Prior Publication Data

US 2004/0113384 A1 Jun. 17, 2004

(30) Foreign Application Priority Data

Dec. 3, 2002 (KR) ............................ 20-2002-0036079 U

(51) Int. Cl.
*B62M 1/12* (2006.01)

(52) U.S. Cl. ..................... 280/233; 280/234; 280/242.1

(58) Field of Classification Search ................. 280/230, 280/232, 233, 224, 242.1, 246, 247, 253, 280/256, 250, 261
See application file for complete search history.

(56) References Cited

U.S. PATENT DOCUMENTS 682,953 A * 9/1901 Norton ....................... 280/215
1,211,303 A * 1/1917 Eckel ........................ 74/551.2
3,895,825 A * 7/1975 Sink ........................... 280/234
4,548,420 A * 10/1985 Patroni, Jr. ................. 280/224
4,630,839 A * 12/1986 Seol ........................... 280/255
4,702,486 A * 10/1987 Tsuchie ...................... 280/255
5,282,640 A * 2/1994 Lindsey ...................... 280/234
5,397,286 A * 3/1995 Chang ......................... 482/62
5,429,379 A * 7/1995 Grigoriev ................... 280/233
5,542,689 A * 8/1996 Chalfant .................. 280/242.1
6,032,970 A * 3/2000 Porter ........................ 280/234
6,105,985 A * 8/2000 Cosgrave .................... 280/248

FOREIGN PATENT DOCUMENTS

GB 2174464 A * 11/1986

* cited by examiner

*Primary Examiner*—Christopher P. Ellis
*Assistant Examiner*—Kelly E Campbell
(74) *Attorney, Agent, or Firm*—Ladas & Parry LLP

(57) ABSTRACT

Disclosed herein is a bicycle of the type driven by operation of a handle. According to the present invention, a shaft rod of the bicycle is installed with a hinge so as to enable the handle to rotate forward or backward. The handle is bent by a constant angle on the basis of the hinge, thereby being divided into both upper and lower portions on the basis of the hinge. The handle is formed at the lower portion thereof with an elongated guide bore, and a roller is inserted inside the guide bore so as to move upward and downward along the guide bore. The roller is connected to the upper end of a rod, which is installed so as to move upward and downward in a rectilinear course according to pulling and pushing operation of the handle.

2 Claims, 4 Drawing Sheets

BICYCLE OF TYPE DRIVEN BY OPERATION OF HANDLE

BACKGROUND OF THE INVENTION

1. Field of the Invention

The present invention relates to a bicycle, and more particularly to a bicycle of the type driven by operation of a handle, which is configured in such a fashion that a front wheel thereof can be driven as the rider pulls the handle of the bicycle backward or pushes it forward, thereby enabling the rider to exercise his/her upper body using the arms as well as exercise his/her legs, and to utilize the bicycle in various manners, thereby maximizing a feeling of satisfaction when using the bicycle.

2. Description of the Related Art

Generally, a conventional bicycle is manufactured to generate a driving power thereof only when the rider pedals to rotate a sprocket of the bicycle, which is adapted to rotate a rear wheel of the bicycle via a chain extending between the sprocket and the rear wheel, thereby allowing the bicycle to move forward according to the rotation of the rear wheel.

As shown in FIG. 1, the conventional bicycle, designated as reference numeral 108, comprises a front wheel 107 and a rear wheel 101, which are coupled at front and rear portions of a frame 102, and a sprocket 104 formed with a pedal 103, which is provided at the lower portion of the frame 102 near the rear wheel 101. The rear wheel 101 and the sprocket 104 are connected by means of a chain 105. A handle 106 of the bicycle 108 is installed at the upper portion of the frame 102 near the front wheel 107 so as to extend trasversely to the frame 102. As the rider turns the handle 106 to the left side or right side, the front wheel 107 of the bicycle 108 is turned to the left side or right side in the same manner as the handle 106, thereby allowing the moving direction of the bicycle 108 to be changed. As the rider rotates the pedal 103 with his/her feet while griping the handle 106 with his/her hands in a state wherein the rider sits on a saddle 109 of the bicycle 108, a certain driving force is applied to the rear wheel 101 of the bicycle 108 according to the rotation of the pedal 103, thereby allowing the bicycle 108 to move forward. During riding, the rider determines the moving direction of the bicycle 108 by operating the orientation of the handle 106.

The bicycle 108 as stated above is considered an eco-friendly machine since it can be driven without requiring fuel and thus not causing any environmental pollution. Further, the bicycle can be effectively utilized for rapid movement within a short distance, and is simple in handling thereof. Furthermore, the bicycle is very effective in increasing the physical strength of the rider's lower body and in achieving outstanding exercise effect of the lower body. Therefore, in addition to serving as a transportation means, the bicycle, of the type fixed indoors so as to be utilized as a fitness machine, is in fashion.

The conventional bicycle 108, however, has a disadvantage in that its exercise effect is adapted only to enhance the rider's lower body, since it allows the rider to utilize the muscles of the legs. During riding, the rider's arms simply serve to grip the handle 106, thereby making it difficult to induce exercise of the rider's upper body or arms. Nowadays, an interest in bicycles has increased, but the function of the conventional existing bicycle 108 is insufficient to satisfy various desires of consumers using the bicycle.

SUMMARY OF THE INVENTION

Therefore, the present invention has been made in view of the above problems, and it is an object of the present invention to provide a bicycle of the type driven by operation of a handle, which is configured in such a fashion that a front wheel thereof can be driven as the rider pulls the handle of the bicycle backward or pushes it forward, thereby enabling the rider to simultaneously perform movements of his/her upper body using their arms as well as rotating motions of his/her legs, and, to utilize the bicycle in further various manners, thereby maximizing a feeling of satisfaction when using the bicycle.

In accordance with the present invention, the above and other objects can be accomplished by the provision of a bicycle of the type driven by operation of a handle, comprising a front wheel and a rear wheel, which are installed at front and rear sides of a frame, a shaft rod to which the handle is connected, the shaft rod being integrally coupled at an upper certain position thereof to the frame at a right angle and connected at a lower end thereof to a center shaft of the front wheel, a sprocket provided at a lower portion of the frame near the rear wheel, the sprocket being formed with a pedal, a chain for transmitting a driving force of the pedal formed at the sprocket to the rear wheel, and a saddle installed at an upper portion of the frame, further comprising: a hinge installed at the shaft rod so as to enable the handle to rotate forward or backward by means of the hinge, the handle being bent by a constant angle on the basis of the hinge, thereby being divided into both upper and lower portions; an elongated guide bore formed at the lower portion of the handle; a roller inserted inside the guide bore so as to move upward and downward along the guide bore; a rod connected at an upper end thereof to the roller so as to move upward and downward in a rectilinear course according to pulling and pushing operations of the handle; a rotating cam associated with a lower end of the rod by means of a connection link; a driving gear installed at one side of the cam so as to rotate along with the cam; a ratchet provided at an internal portion of the driving gear so as to rotate in only one direction due to a stopper; an auxiliary sprocket installed around an outer periphery of the driving gear so as to rotate along with the driving gear; and a center shaft gear integrally installed to the center shaft of the front wheel so as to be associated with the auxiliary sprocket through a chain.

Preferably, the shaft rod may be formed near an upper end thereof with a fixing hole, and the handle may be formed at a certain position with a pin hole, corresponding to the fixing hole, whereby in a state wherein the pin hole of the handle and the fixing hole of the shaft rod are aligned, a pin is penetrated therethrough so as to fix the handle to the shaft rod.

According to the bicycle of the type driven by operation of the handle according to the present invention, if the rider pushes the handle of the bicycle forward, the roller inserted inside the guide bore moves upward along the guide bore according to the rotation of the handle, and simultaneously, the rod connected to the roller also moves upward, thereby rotating the cam connected thereto through the connection link. As the cam rotates, the driving gear and the auxiliary sprocket, which are connected to the cam, also rotate together. According to the rotation of the sprocket, the center shaft gear of the front wheel, associated with the sprocket through the chain, rotates the front wheel for driving thereof.

Therefore, since the bicycle can be driven as the rider pulls or pushes the handle by moving his/her arms, it is possible to secure effective exercise of the rider's upper body. As a result, the rider can uniformly develop his/her upper body as well as lower body. Further, according to the present invention, since the rider can ride the bicycle in various manners, deviating from a conventional simple riding manner using only legs, the bicycle of the present invention can satisfy the various desires of consumers.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
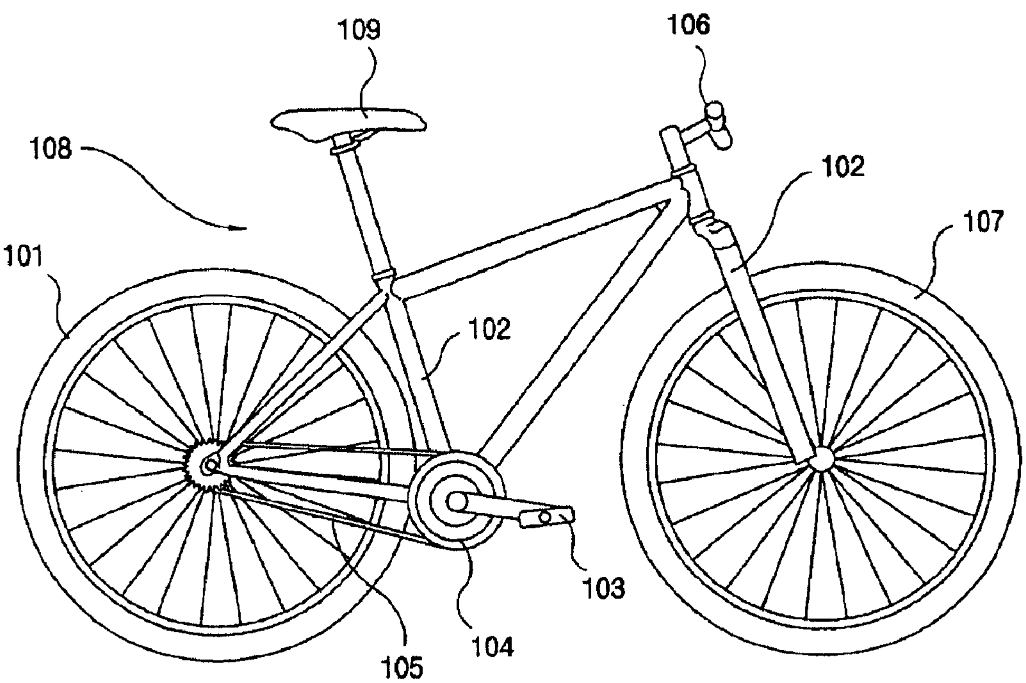
FIG. 1 is a side view illustrating a bicycle of the prior art.
Figure 2:
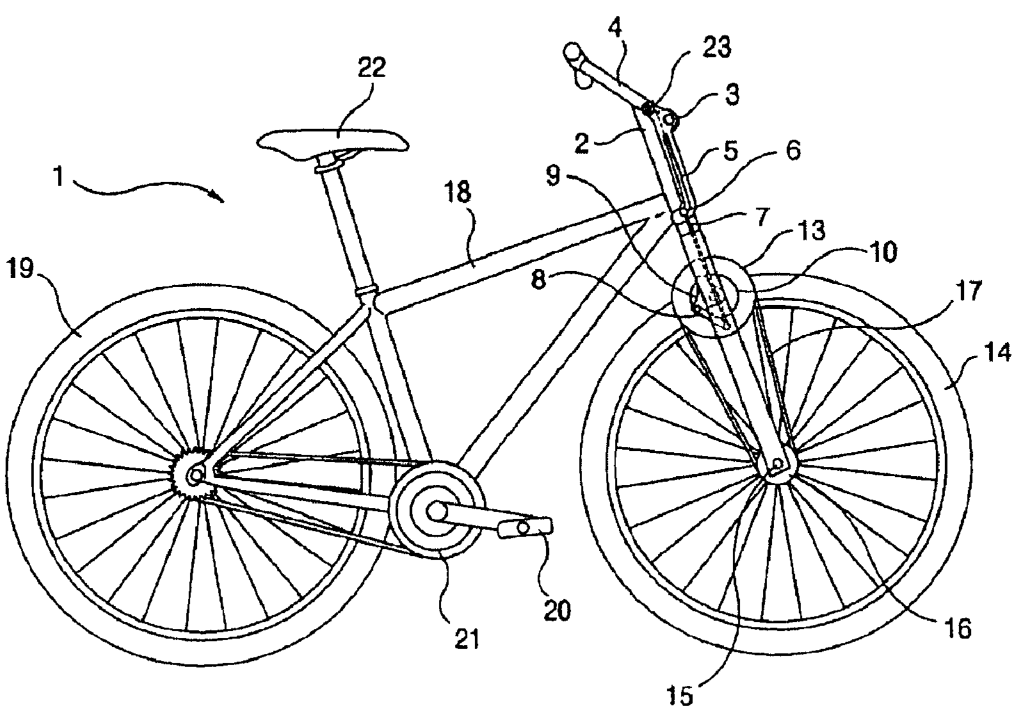
FIG. 2 is a side view illustrating a bicycle in accordance with the present invention.

Now, the configuration of the bicycle according to the present invention will be described in reference to FIGS. 2 to 5.

The bicycle of the present invention, designated as reference numeral 1, comprises a front wheel 14 and a rear wheel 19, which are installed at front and rear sides of a frame 18. The front wheel 14 of the bicycle 1 is adapted to be driven as the rider pulls a handle 4 of the bicycle 1 backward or pushes it forward, thereby moving the bicycle 1 forward. The handle 4 is connected to a shaft rod 2, which is integrally coupled to the frame 18 at a right angle. The lower end of the shaft rod 2 is connected to a center shaft 15 of the front wheel 14. In this way, the front wheel 14 of the bicycle 1 is operatively associated with the handle 4. The rear wheel 19 of the bicycle 1 is directly coupled to a certain rear portion of the frame 18, and a sprocket 21 is provided at the lower portion of the frame 18 near the rear wheel 19. The sprocket 21 is formed with a pedal 20. In order to transmit a driving force of the pedal 20 formed at the sprocket 21 to the rear wheel 19, a chain 17 is connected between the sprocket 21 and the rear wheel 19. The frame 18 is further provided with a saddle 20 at the uppermost portion thereof. Considering again the installation of the handle 4 to the shaft rod 2 in detail, the handle 4 is installed so as to rotate forward or backward by means of a hinge 3 installed at the upper end of the shaft rod 2. The handle 4 is bent by a constant angle on the basis of the hinge 3, thereby being divided into both upper and lower portions. The lower portion of the handle 4 is formed with an elongated guide bore 5 extending over the whole longitudinal length. Inside the guide bore 5 is inserted a roller 6 so as to be moved upward and downward along the guide bore 5. The roller 6 is connected to the upper end of a rod 7, which is installed so as to move upward and downward in a rectilinear course according to the pulling and pushing operations of the handle 4. The lower end of the rod 7 is associated with a rotating cam 9 by means of a connection link 8. The cam 9 is installed at one side thereof with a driving gear 10 rotating along with the cam 9. The driving gear 10 is provided at the internal portion thereof with a ratchet 12, which is adapted to rotate in only one direction due to a stopper 11. Around the outer periphery of the driving gear 10 is installed an auxiliary sprocket 13 rotating along with the driving gear 10. The auxiliary sprocket 13 is associated with a center shaft gear 16, which is integrally attached to the center shaft 15 of the front wheel 14, by means of a chain 17.

The bicycle 1 configured as stated above is characterized in that the front wheel 14 thereof can be driven by operation of the handle 4. For this, the handle 4 is rotatably installed to the upper portion of the shaft rod 2 by means of the hinge 3 as well as associated, by means of the rod 7, with the cam 9, the driving gear 10 and the auxiliary sprocket 13 driven according to the rotation of the cam 9. Since the auxiliary sprocket 13 is associated, by means of the chain 17, with the center shaft gear 16 integrally connected to the center shaft 15 of the front wheel 14, the front wheel 14 can be driven according to the operation of the handle 4.

Explaining again the driving of the bicycle 1 according to operation of the handle 4 in detail, as the rider pushes the handle 4 forward or pulls it backward, the roller 6 connected with the rod 7 moves upward and downward along the guide bore 5 formed at the handle 4, and, simultaneously, the rod 7 moves upward and downward in a rectilinear course according to the movements of the roller 6, thereby rotating the cam 9 connected to the lower portion thereof. As the driving gear 10 and the auxiliary sprocket 13, associated with the cam 9, rotate according to the rotation of the cam 9, the chain 17 coupled around the auxiliary sprocket 13 moves to rotate the center shaft gear 16 of the front wheel 14 connected thereto, thereby applying a rotating force to the front wheel 14 for driving thereof.

Figure 3:
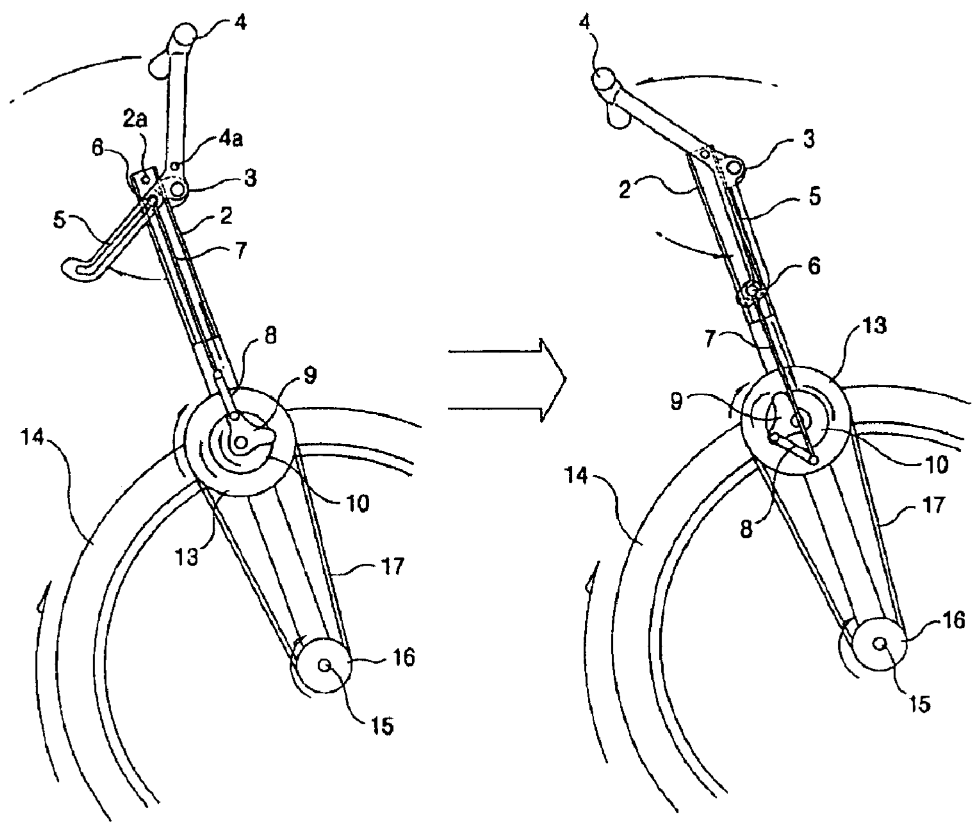
FIG. 3 is a partially broken away side view illustrating a state wherein the bicycle of the present invention is driven according to the operation of a handle.

Referring to FIG. 3 illustrating a state wherein the front wheel 14 of the bicycle 1 is driven by the handle 4, if the rider pushes the handle 4 of the bicycle 1 forward, the roller 6 inserted inside the guide bore 5 moves upward along the guide bore 5 according to the rotation of the handle 4, and simultaneously, the rod 7 connected to the roller 6 also moves upward, thereby rotating the cam 9 connected thereto through the connection link 8. As the cam 9 rotates, the driving gear 10 and the auxiliary sprocket 13, which are connected to the cam 9, also rotate together. According to the rotation of the sprocket 13, the center shaft gear 16 of the front wheel 14, associated with the sprocket 13 through the chain 17, rotates the front wheel 14 for driving thereof.

On the other hand, if the rider pulls the handle 4 of the bicycle 1 backward, the roller 6 inserted inside the guide bore 5 moves downward along the guide bore 5 according to the rotation of the handle 4, and simultaneously, the rod 7 connected to the roller 6 also moves downward, thereby rotating the cam 9 connected thereto through the connection link 8. As the cam 9 rotates, the auxiliary sprocket 13 also rotates, thereby allowing the center shaft gear 16 of the front wheel 14 to rotate.

Figure 4:
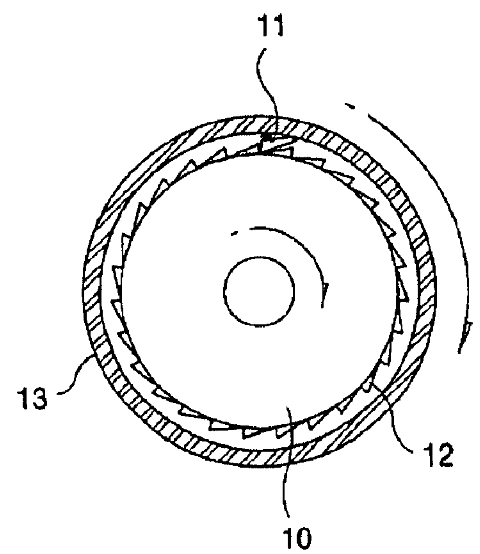
FIG. 4 is a side sectional view illustrating a gear installed at a front wheel of the bicycle in accordance with the present invention.

As shown in FIG. 4, the driving gear 10 connected to the cam 9 is provided therein with the ratchet 12. In case of driving the front wheel 14 according to the operation of the handle 4, the ratchet 12 formed at the internal portion of the driving gear 10 is engaged with the stopper 11 installed at the internal portion of the auxiliary sprocket 13, thereby causing the driving gear 10 and the auxiliary sprocket 13 to rotate together. In case of a general driving mode of the front wheel 14 according to the operation of the pedal 20, only the auxiliary sprocket 13 rotates to enable the front wheel 14 to be driven.

The handle 4 can be selectively assembled to or disassembled from the upper end of the shaft rod 2 coupled to the frame 18, if necessary. For this, the shaft rod 2 is formed near the upper end thereof with a fixing hole 2*a*, and the handle 4 is formed at a certain position with a pin hole 4*a*, corresponding to the fixing hole 2*a*. In a state wherein the pin hole 4*a* of the handle 4 and the fixing hole 2*a* of the shaft rod 2 are aligned, a pin 23 is inserted therethrough so as to fix the handle 4 to the shaft rod 2.

Figure 5:
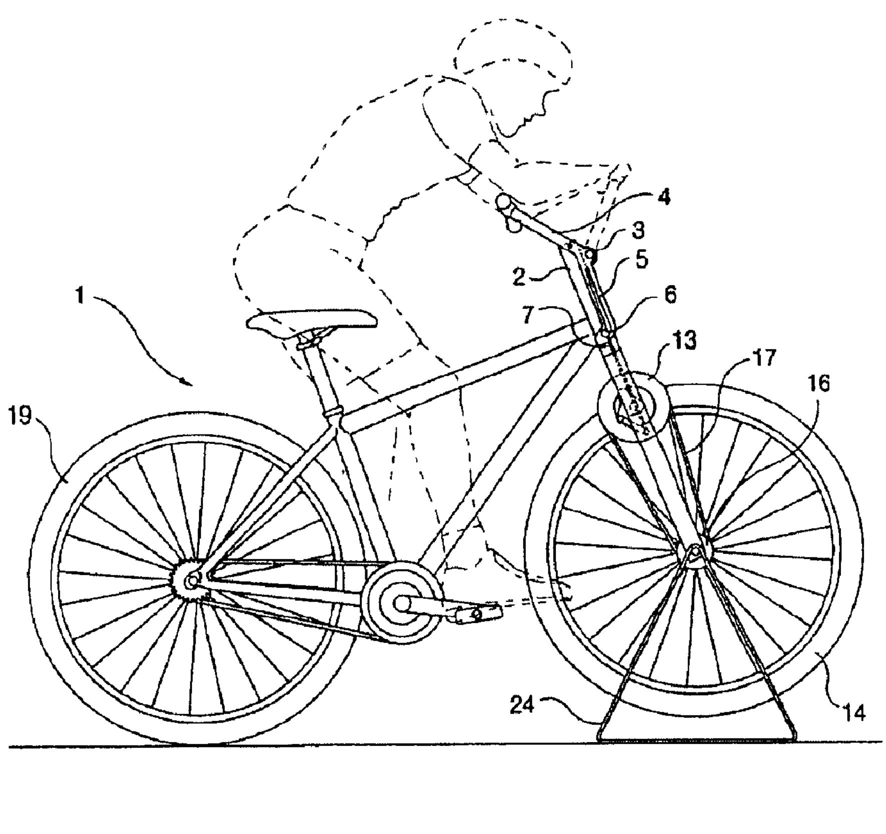
FIG. 5 is a side view illustrating a state wherein the bicycle of the present invention is utilized as a fitness machine.

The bicycle 1 of the present invention, as shown in FIG. 5, can be utilized as a fitness machine. In this case, the bicycle 1 further comprises a triangular support member 24. In a state wherein the triangular support member 24 is fixed to the center shaft 15 of the front wheel 14, the rider pulls the handle 4 backward or pushes it forward by moving his/her arms so as to rotate the front wheel 14 of the bicycle 1 while being seated on the saddle 1, resulting in exercise of the rider's upper body.

Since the front wheel 14 of the bicycle 1 can be driven by the handle 4 as stated above, the bicycle 1 of the present invention enables the rider to effectively perform exercise of his/her upper body as well as his/her lower body, thereby inducing uniform development of the whole body. Further, the rider can simply perform exercise of the whole body even indoors by using only the bicycle 1 of the present invention, without separate fitness appliances.

INDUSTRIAL APPLICABILITY

As apparent from the above description, the present invention provides a bicycle of the type driven by operation of a handle, which can be driven as the rider pulls the handle backward or pushes it forward by moving his/her arms, thereby securing effective exercise of the rider's upper body. As a result, the rider can uniformly develop his/her upper body as well as lower body. Further, according to the present invention, since the rider can ride the bicycle in various manners, deviating from a conventional simple riding manner using only the legs, the bicycle of the present invention can satisfy the various desires of consumers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bicycle of the type driven by operation of a handle, comprising a front wheel and a rear wheel, which are installed at front and rear sides of a frame, a shaft rod to which the handle is connected, the shaft rod being integrally coupled at an upper certain position thereof to the frame at a right angle and connected at a lower end thereof to a center shaft of the front wheel, a sprocket provided at a lower portion of the frame near the rear wheel, the sprocket being formed with a pedal, a chain for transmitting a driving force of the pedal formed at the sprocket to the rear wheel, and a saddle installed at an upper portion of the frame, further comprising:

- a hinge installed at the shaft rod so as to enable the handle to rotate forward or backward by means of the hinge, the handle being bent by a constant angle on the basis of the hinge, thereby being divided into both upper and lower portions;
- an elongated guide bore formed at the lower portion of the handle;
- a roller inserted inside the guide bore so as to move upward and downward along the guide bore;
- a rod connected at an upper end thereof to the roller so as to move upward and downward in a rectilinear course according to pulling and pushing operations of the handle;
- a rotating cam associated with a lower end of the rod by means of a connection link;
- a driving gear installed at one side of the cam so as to rotate along with the cam;
- a ratchet provided at an internal portion of the driving gear so as to rotate in only one direction due to a stopper;
- an auxiliary sprocket installed around an outer periphery of the driving gear so as to rotate along with the driving gear; and
- a center shaft gear integrally installed to the center shaft of the front wheel so as to be associated with the auxiliary sprocket through a chain.

2. The bicycle as set forth in claim 1, wherein the shaft rod is formed near an upper end thereof with a fixing hole, and the handle is formed at a certain position with a pin hole, in correspondence to the fixing hole, whereby in a state wherein the pin hole of the handle and the fixing hole of the shaft rod are aligned, a pin is inserted therethrough so as to fix the handle to the shaft rod.

* * * * *